July 20, 1965  M. B. CONRAD  3,195,642
REVERSE ACTING ANCHOR FOR WELL PACKERS AND THE LIKE
Original Filed Nov. 23, 1959  7 Sheets-Sheet 1
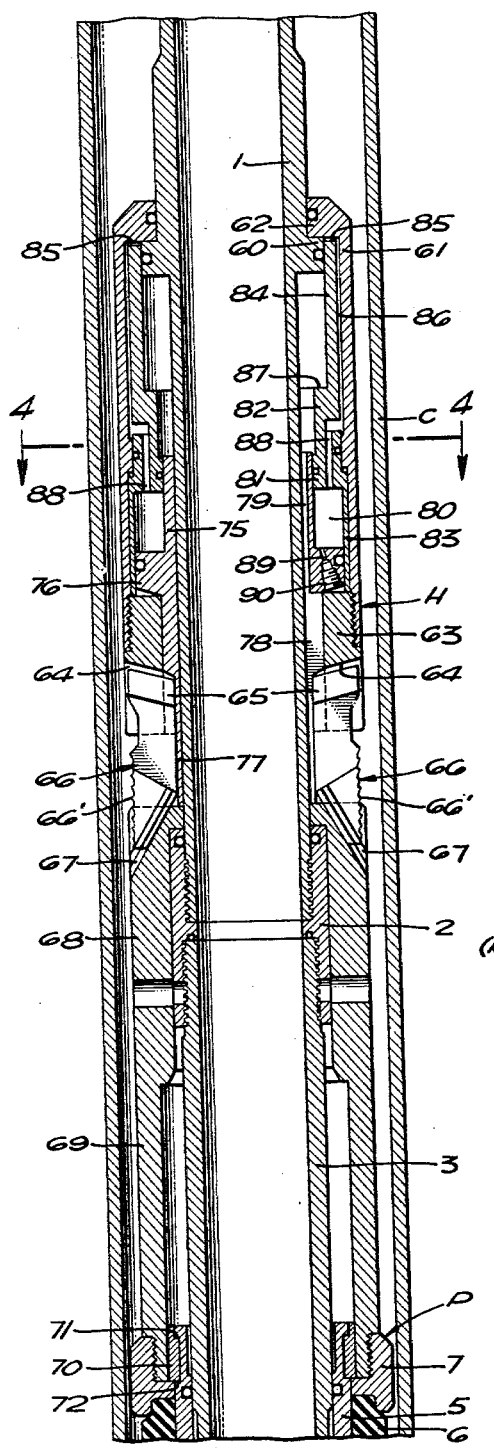
FIG. 1a. (RUNNING IN)
FIG. 1b. (RUNNING IN)
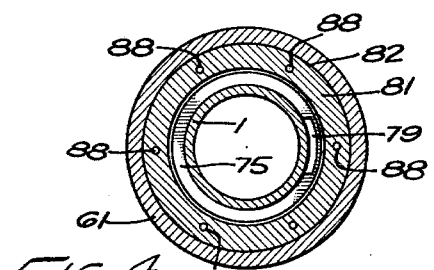
FIG. 4.
INVENTOR.
MARTIN B. CONRAD
BY Lyon & Lyon
ATTORNEYS

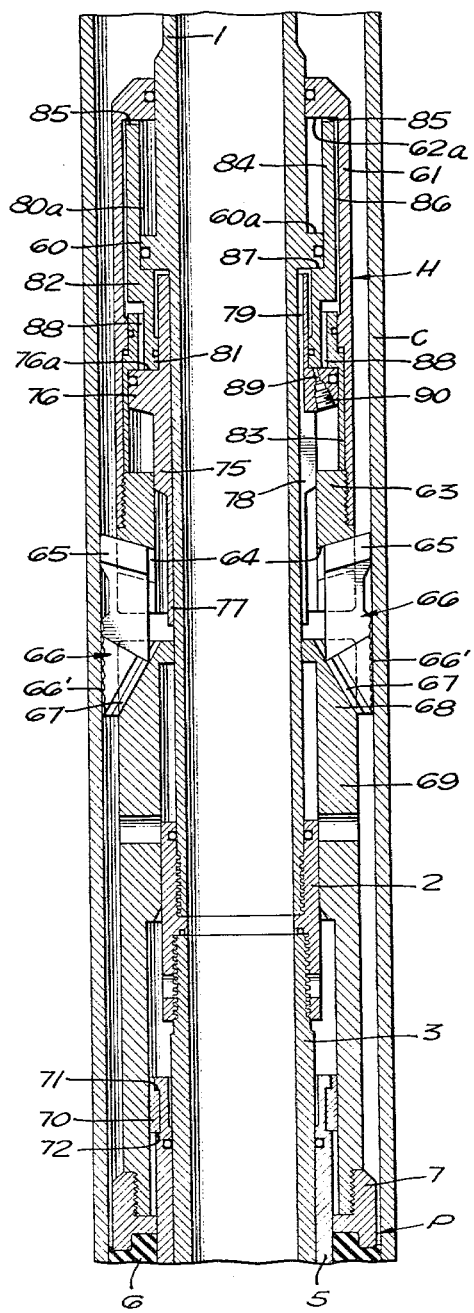
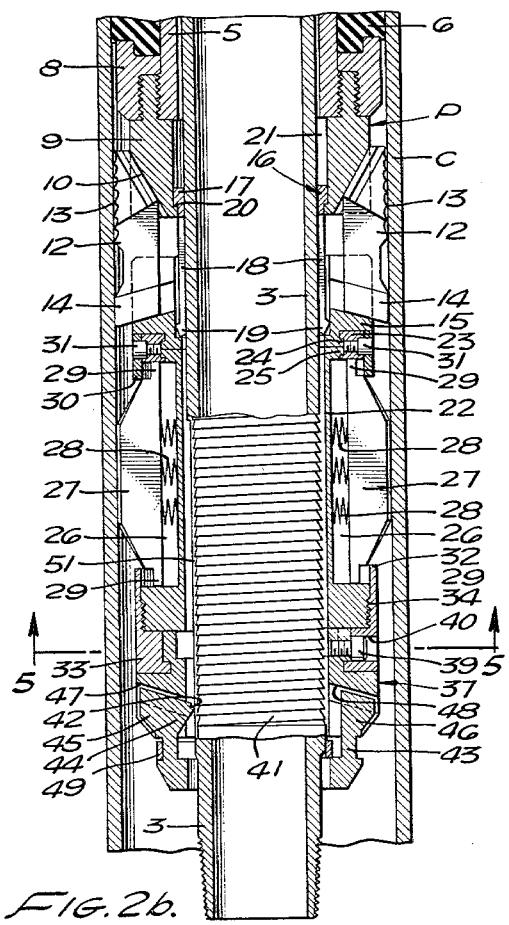
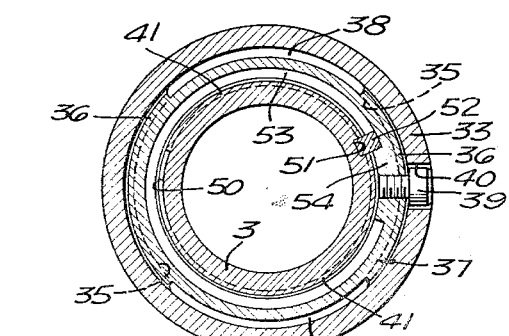
FIG. 2a. (SET)
FIG. 2b. (SET)
FIG. 5.
INVENTOR.
MARTIN B. CONRAD
BY Lyon & Lyon
ATTORNEYS

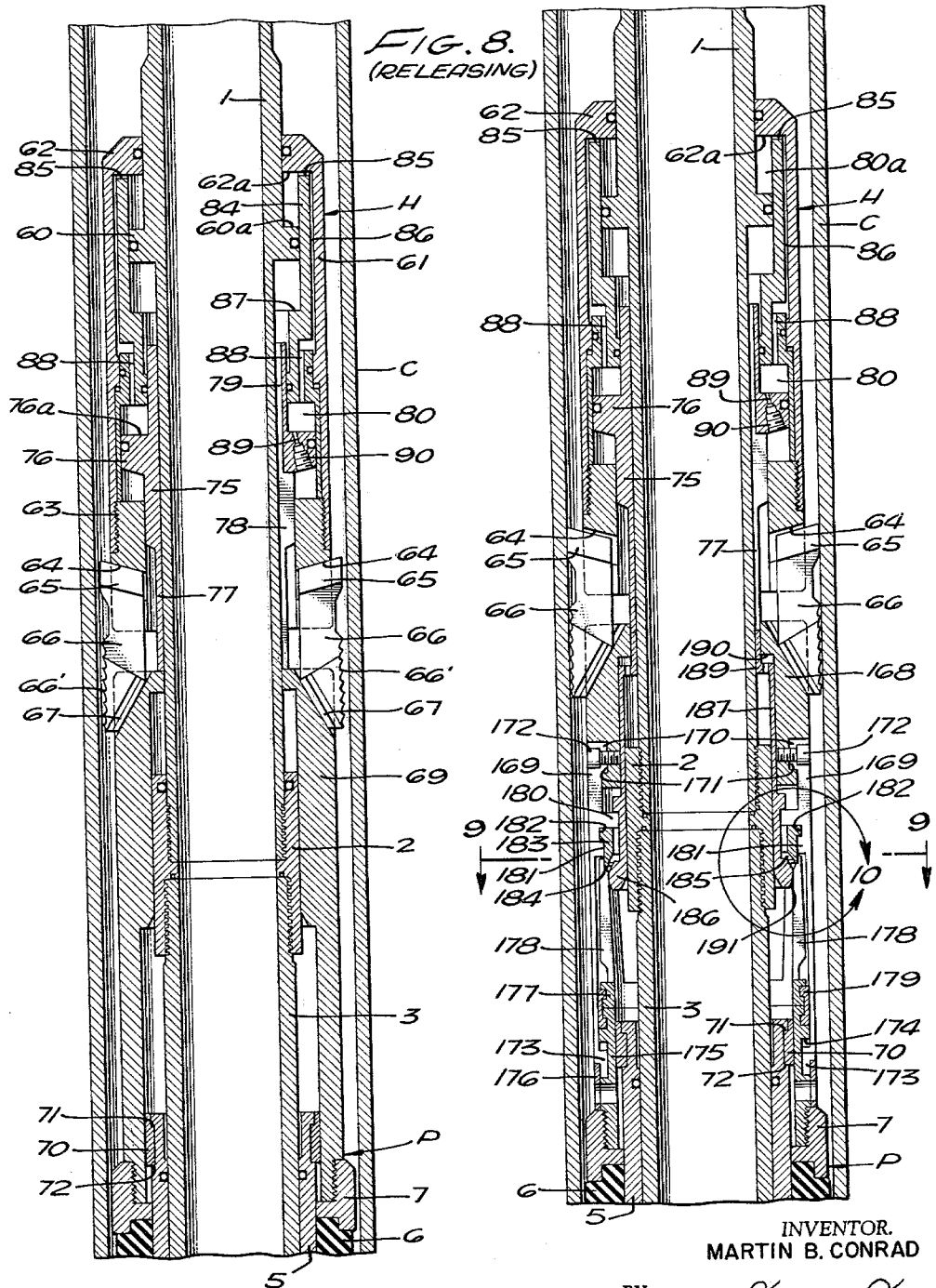

July 20, 1965 — M. B. CONRAD — 3,195,642
REVERSE ACTING ANCHOR FOR WELL PACKERS AND THE LIKE
Original Filed Nov. 23, 1959 — 7 Sheets-Sheet 4
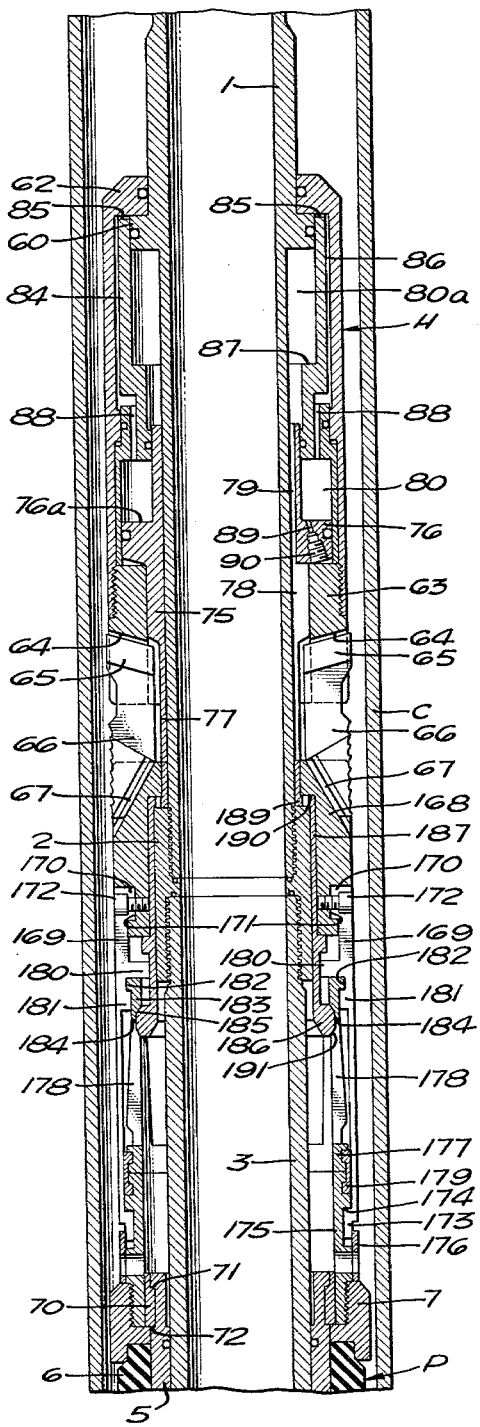
FIG. 6. (RUNNING)
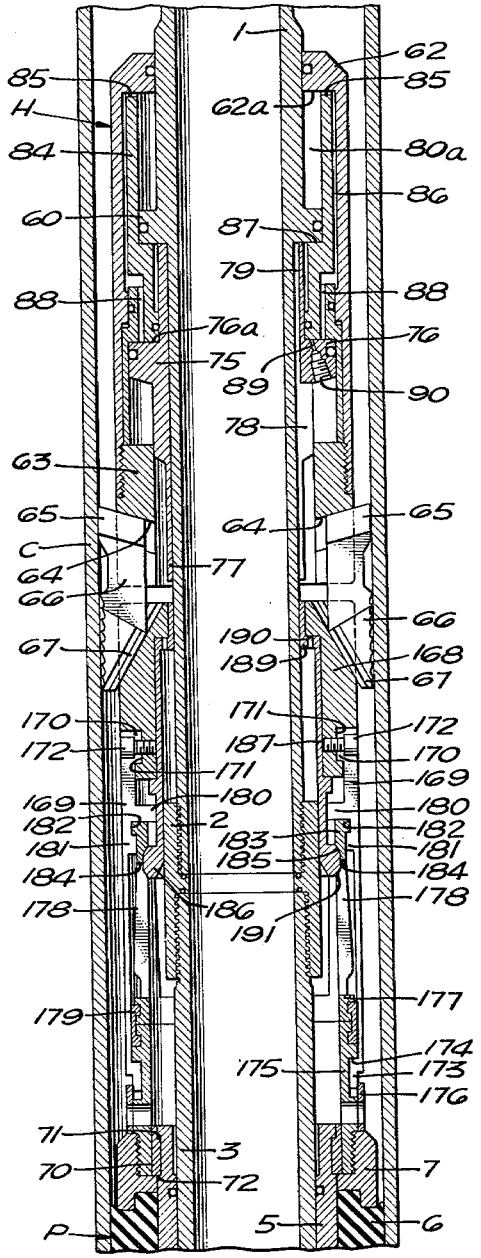
FIG. 7. (SET)
INVENTOR.
MARTIN B. CONRAD
BY Lyon & Lyon
ATTORNEYS

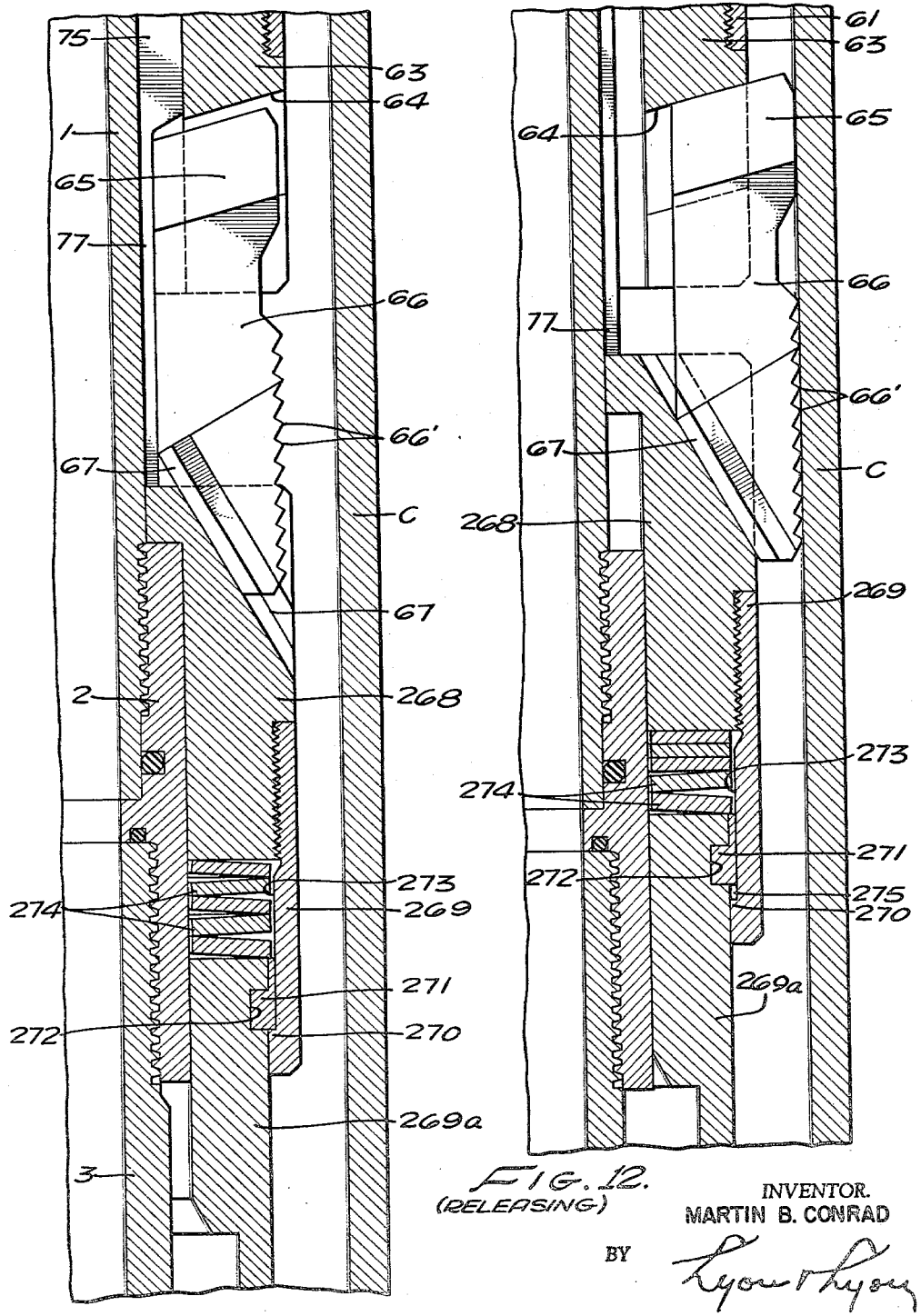

July 20, 1965  M. B. CONRAD  3,195,642
REVERSE ACTING ANCHOR FOR WELL PACKERS AND THE LIKE
Original Filed Nov. 23, 1959  7 Sheets-Sheet 6

INVENTOR.
MARTIN B. CONRAD
BY
ATTORNEYS

July 20, 1965  M. B. CONRAD  3,195,642
REVERSE ACTING ANCHOR FOR WELL PACKERS AND THE LIKE
Original Filed Nov. 23, 1959  7 Sheets-Sheet 7

INVENTOR.
MARTIN B. CONRAD
BY
ATTORNEYS

3,195,642
United States Patent Office
Patented July 20, 1965

---

3,195,642
REVERSE ACTING ANCHOR FOR WELL PACKERS AND THE LIKE
Martin B. Conrad, P.O. Box 1026, Downey, Calif.
Continuation of abandoned application Ser. No. 854,769, Nov. 23, 1959. This application Mar. 12, 1964, Ser. No. 352,714
36 Claims. (Cl. 166—134)

The present invention relates to well tools, and more particularly to an anchor for a well tool such as a packer or the like, adapted to be run into an oil or gas well and anchored in the well casing.

This application is a continuation of my application for Reverse Acting Anchor for Well Packers and The Like filed November 23, 1959, Serial No. 854,769.

In well packer installations where the packer is to be subjected to substantial pressure from below, it is the practice to provide an anchor or holddown device which will prevent upward movement of the packer assembly. Such packers with holddown means thereon are commonly employed in various fluid injection well treatments such as cementing, formation fracturing, acidizing and the like, during which the packer is subjected to substantial pressure tending to force the packer upwardly in the well bore or casing.

Heretofore, fluid-pressure-operated holddown devices have been provided which anchor the packer against upward movement in the well bore as a function of fluid pressure passing through the packer into the well during one of the aforesaid types of fluid injection operations. Such prior tools have characteristically included a chamber into which the fluid being pumped into the well is admitted so as to actuate the holddown device and force holddown or anchor slips into engagement with the well casing to prevent upward movement thereof, or to lock such slips in engagement with the well casing. In such devices the pressure chamber quite frequently becomes clogged or filled with solid materials such as cement, sand, solids from drilling fluids and the like, so that the anchor device or holddown may not always be readily released when it is desired to recover the tool from the well.

Accordingly, an object of the present invention is to provide a well packer anchor or holddown device which is effective to set holddown slips in engagement with the well casing so as to prevent upward movement of a packer disposed beneath the holddown device, so that the greater the pressure acting on the packer tending to elevate the same, the greater will be the holding effect of the holddown device. This objective is accomplished without employing operating means which function responsive to fluid being pumped into the well. Instead, the holddown device operates responsive to simple longitudinal movement of the drill pipe or tubing string employed to run the packer and holddown device into the well.

Another object is to provide a holddown device which may be characterized as "reverse-acting," inasmuch as an upward pull on the running-in string of pipe produces a downward thrust serving to effect disengagement of the holddown or anchor slips from the well casing.

Still another object is to provide a well tool anchor device which effectively minimizes or reduces the necessary upward tug on the running-in string of pipe required to release the holddown or anchor slips from engagement with the casing by employing a differential area confined fluid mechanism which, responsive to an upward pull on the running-in string of pipe, imposes a significantly multiplied force on the holddown slip mechanism for releasing the slips from the well casing.

One of the specific objects of the invention is to provide a well tool anchor mechanism of the type mentioned above which will assure release of the holddown slip mechanism, notwithstanding the possibility that a packer device disposed beneath the holddown mechanism may be securely and seemingly irretrievably set in engagement with the well casing and held in a set condition by high fluid pressure thereon, or by sand or other solid deposits accumulated above the packer or below the packer, as the case may be. In accomplishing this objective, a mechanism is provided which enables foreshortening of the device or relative movement of the holddown slip expander and the packer rubber towards one another, which foreshortening or relative movement is ordinarily precluded in conventional forms of packers and packer holddowns.

Yet another object is to provide a holddown mechanism for well packers wherein the holddown slips are retarded in their movement into engagement with the well casing upon lowering of the running-in string of pipe to set the packer and to set the holddown slips in engagement with the casing, so that the holddown slips are not caused to slide or drag along the casing wall with resultant damage to the slip teeth or wickers as occurs in conventional forms of holddown devices through which the packer setting load is transmitted.

Other objects and advantages of the invention will hereinafter be described or will become apparent to those skilled in the art in the light of ensuing detailed description of several embodiments of the invention.

In the accompanying drawings:

FIGS. 1a and 1b are views in longitudinal section through a double-holding well packer assembly employing one form of the novel holddown mechanism hereof, with certain of the parts shown in elevation; FIG. 1b constituting a downward continuation of FIG. 1a, the packer assembly being shown in condition for running into a well;

FIGS. 2a and 2b are views corresponding to FIGS. 1a and 1b but showing the double-holding packer assembly set in the well casing;

FIG. 3 is a longitudinal sectional view corresponding to FIGS. 1a and 2a, showing the novel holddown mechanism in a stage of partial release;

FIG. 4 is a transverse sectional view through the holddown mechanism as taken on the line 4—4 of FIG. 1a;

FIG. 5 is a transverse sectional view on an enlarged scale as taken on the line 5—5 of FIG. 2b;

FIG. 6 is a fragmentary longitudinal sectional view showing a modification enabling foreshortening, the holddown mechanism being in condition for running into a well;

FIG. 7 is a view corresponding to FIG. 6, but showing the holddown mechanism set in the well;

FIG. 8 is a view corresponding to FIGS. 6 and 7, but showing the holddown mechanism in a partial stage of release;

FIG. 11 is a fragmentary detail view in longitudinal section through a further modified form of holddown mechanism embodying means enabling foreshortening, with the parts shown in condition for running into a well;

FIG. 12 is a view corresponding to FIG. 11 with the parts shown in a condition in which the holddown mechanism has been set in the well and is being released;

Like reference characters in the several views of the drawings and in the following description designate corresponding parts.

Figure 9:
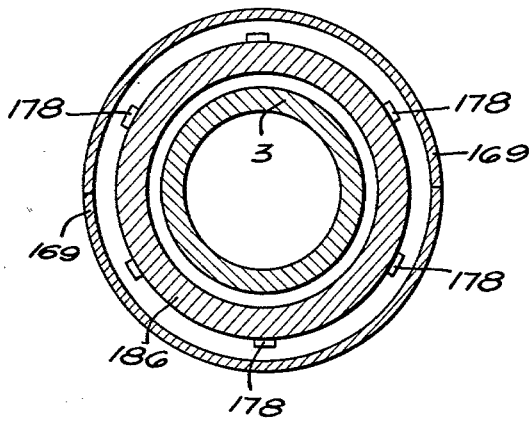
FIG. 9 is a transverse sectional view on an enlarged scale as taken on the line 9—9 of FIG. 8.

Referring to FIGS. 1–5, the holddown mechanism of the present invention is illustrated in conjunction with a downwardly holding well packer, the holddown mechanism being generally denoted at H and the packer device being generally denoted at P. The holddown mechanism includes a longitudinally extended body or mandrel 1 connected as by a coupling 2 to the downwardly extended body or mandrel 3 of the packer P. Both of the mandrels 1 and 3 in the illustrated embodiments have a fairly large diameter opening therethrough for the passage of well treating fluids or the like.

In use, the assembly will be supported on a string (not shown) of drill pipe or tubing which, as will hereinafter more fully appear, is selectively manipulated in order to set and release both the packer and the holddown in a well casing C.

The packer subassembly P forms no part of the present invention and the construction shown is one which is known and which has certain operating characteristics and functions which are common to well packers in general.

In order to provide a better understanding of the function and operation of the holddown subassembly H, however, the general structure and function of the packer mechanism requires some explanation.

Disposed about the mandrel 3 and slidable longitudinally therealong in sealing engagement therewith, is a sleeve 5 about which is disposed a resilient packing element 6 composed of rubber or the like. Engaged with the packing element 6 at its upper end is a gauge ring 7 slidable along the sleeve 5 to press the packing element 6 against a lower ring 8 which is threadedly mounted upon an expander cone member 9 to which the sleeve 5 is also connected at its lower end.

The member 9 has connected thereto, as by a dovetailed sliding connection 10, a suitable number of casing-engaging slips 12 which are expandable into engagement with the casing C and are provided with downwardly facing wickers or teeth 13 adapted to bite into the casing. These slips 12 at their base are provided with a T-head 14 engaged in upwardly opening T-slots in a slip carrying ring 15.

A connector sleeve 16 is also preferably employed to interconnect the cone member 9 and the slip carrier ring 15 against movement away from one another beyond a predetermined limit. The sleeve 16 comprises an annular head 17 having a plurality of circumferentially spaced fingers 18 depending therefrom and provided with enlargements 19 at their lower extremities engageable in a complemental recess in the inner periphery of the slip carrier ring 15.

The head 17 engages a shoulder 20 internally of expander member 9 to limit movement of expander 9 away from the slip carrier ring 15, but movement of the cone 9 in the other direction is permitted by virtue of a clearance space 21 between the inner periphery of the cone 9 and the body or mandrel 3.

Below the slip carrier ring 15 is a drag block carrier housing 22 which is connected to the slip carrier ring for relative rotation by means of a slip coupling ring 23 suitably formed to engage contiguous flanges 24 and 25 projecting from the slip carrier ring and the upper extremity of the housing 22, respectively.

Longitudinally extended and circumferentially spaced slots 26 are formed in the drag block carrier housing 22 for the reception of a like number of radially shiftable casing-engaging friction drag blocks 27 which are urged outwardly as by coiled compression springs 28. Outward movement of the drag blocks 27 is limited by engagement of ears 29, 29 at the opposite ends of the drag blocks 27. The upper ear 29 engages an annular collar 30 which is suitably connected to the sections of the split swivel ring 23 as by fasteners 31; the lower ear 29 engages an upwardly extending skirt 32 formed on a connector 33 which is threadedly secured as at 34 to the lower end of the drag block carrier housing 22.

Connector 33 is provided with a pair of diametrically opposed inwardly projecting arcuate flanges 35 for engagement by a pair of outwardly projecting arcuate flanges or ribs 36 formed on a control dog support generally designated 37 which is disposed about the mandrel 3. The arcuate space between the respective flanges 35 and 36 is such that the flanges 36 may be inserted axially of the connector 33 through the arcuate spaces 38 between flanges 35, whereupon rotation of the dog support 37 through approximately 90° will bring flanges 35 and 36 into overlapping engagement as is more particularly shown in FIG. 5. Thus the dog support 37 is connected to the connector 33 by what is conventionally referred to as a bayonet slot type joint. Disconnection of these parts is precluded by means of a lock screw 39 which extends through a bored hole 40 in connector 33 and is threaded into the dog support 37.

The mandrel or body 3 is provided adjacent its lower end with wickers or teeth 41 spaced longitudinally therealong, which are engageable by complemental wickers or teeth 42 formed internally and to one side of a control collar 43 which is disposed about the body or mandrel 3 in spaced relation thereto. The teeth or wickers 42 extend about a relatively narrow arcuate section and are formed on an inwardly projecting portion 44 of an upstanding T-head 45 carried by the collar 43. This T-head 45, and particularly the portion 44 thereof, constitutes a latching dog engageable with the mandrel wickers or teeth 41.

In diametrically spaced relation to the T-head 45 is a second T-head 46, and these T-heads are slidably disposed in T-slots 47 and 48 respectively, formed in the lower end of dog carrier 37. These slots 47 and 48 are inclined relative to a plane normal to the axis of the mandrel and extend parallel to one another. The latching dog portion 44 of T-head 45 is normally maintained in engagement with the wickers or teeth 41 on the mandrel, as by means of an annular spring 49 which extends about the outside of the T-head 45 and between the T-heads 45 and 46 into engagement with the mandrel 3 at the opposite side of the latter from the T-head 45, as is best seen in FIGS. 1b and 2b. The spring 49 is stressed when the dog portion 44 effectively is in engagement with the wickers or teeth 41.

The control dog mechanism thus far described is adapted to function to releasably connect the drag block carrier housing 22 to the mandrel 3, so that these parts will move longitudinally of the well bore or casing C as a unit as the tool is being shifted longitudinally of the well bore; e.g. when the tool is being run into a well.

As will hereinafter be made more readily apparent, it is desired that the control dog portion 44 be effectively disengaged from the teeth 41 on the mandrel, to enable the mandrel 3 to move longitudinally through the drag block carrier housing 22 to enable the tool to be set in the casing C. To this end, the mandrel, as best seen in FIG. 5, is provided with a longitudinally extended slot 50 which interrupts the wickers or teeth 41 and provides a smooth unwickered section which will permit longitudinal movement of the mandrel relative to the drag block carrier housing 22 when the mandrel is rotated to a position in which the dog section 44 is disposed in the slot 50.

In addition, it will be noted that the mandrel is provided with a longitudinally extended keyway 51 spaced angularly from the slot 50 and in which is slidably disposed a positioning key 52. This key 52 rides in a circumferentially extended groove 53 formed in the dog carrier 37, but relative rotation of the dog carrier 37 and the mandrel 3 is limited by a stop projection 54 which interrupts the groove 53. It will be understood that the angular relationship between the stop 54, the key 52 and the slot 50 is preferably such that when the key 52 is engaged with one side of the stop 54 as shown in FIG. 5, the slot 50 will be aligned with the latching dog portion 44 of the control latch mechanism, while in all other angular positions of the key 52 relative ot the stop 54 the dog portion 44 will be engaged with the mandrel wickers or teeth 41.

As previously mentioned, the packer and control mechanism are not specifically pertinent to the present invention but are simply illustrative of a form of well packer or well tool which may have connected thereto a novel holddown mechanism containing the invention which is now to be described.

As stated, the holddown mechanism includes a longitudinally extended tubular mandrel or body 1 which is connected to the packer mandrel 3 by the coupling 2. Adjacent its upper end the holddown mandrel 1 is provided with a radially extended circumferentially continuous flange 60. Slidably disposed about the mandrel is a longitudinally extended hollow housing 61, having at its upper extremity a radially inwardly extending annular flange 62 sealingly and slidably engaged with the mandrel 1 above the mandrel flange 60.

At its lower extremity the housing 61 carries a slip supporting ring 63 which forms a projection extending inwardly of the housing towards the mandrel 1. The slip carrier ring 63 is provided with a suitable number of circumferentially spaced T-slots 64 in which are laterally shiftable disposed T-heads 65 of a like number of casing-engaging holddown slips generally designated 66. The lower ends of the slips 66 are of tapered form and slidably connected as by dove-tailed fit 67 with an expander cone section 68 of a longitudinally extended connector sub 69. The connector sub 69 is slidably mounted upon the coupling 2 referred to above, and extends therebelow to a point where it is connected with the packer gauge ring 7. As previously described, the gauge ring 7 is slidably shiftable downwardly along the packer sleeve 5 but upward movement of the gauge ring 7 and consequent upward movement of the connector sub 69 is limited by a split or sectional connector ring 70, which shoulders at 71 with the packer sleeve 5 and at 72 with the gauge ring 7 (see FIG. 1a).

Slidably disposed upon the mandrel 1 is an actuator sleeve 75 having an outstanding annular piston 76 thereon which is adapted to abut with the slip supporting ring 63, the sleeve 75 extending between the ring 63 and the mandrel 1 and having an elongated reduced section 77 extending between the slips 66 and the mandrel 1 for abutting contact with the upper extremity of the connector sub 69. This sleeve 75 is provided with a longitudinally extended radial slot 78 from its lower extremity to the annular piston 76, and from the piston 76 to its upper extremity the sleeve 75 is radially slotted partially therethrough as shown at 79 to provide a fluid passageway leading between the sleeve 75 and the mandrel 1.

The housing 61 is formed with, or as in the illustrative embodiment has installed therein, means which provides an annular chamber 80 between the annular piston 76 of sleeve 75 and an annular opposed piston 81. This piston 81 in the illustrative embodiment is formed on a sleeve 82 which is installed in the housing 61 prior to the assembly of the slip carrier ring 63 with the housing 61.

The sleeve 82 has a skirt 83 depending from the piston 81 with which the annular piston 76 on sleeve 75 is slidably and sealingly engaged. In addition, the sleeve 82 includes a skirt 84 extending upwardly from the piston 81 in spaced relation to the inner wall of housing 61, the skirt 84 terminating in abutting engagement with the flange 62 at the upper end of the housing and being radially slotted as at 85 to provide a fluid passageway leading from the annular clearance space 86 between the skirt 84 and the housing 61. Annular flange 60 on the mandrel 1 is slidably and sealingly engaged internally of the skirt 84 within limits defined by the flange 62 at the upper end and a shoulder 87 on sleeve 82 beetween the skirt 84 and the piston 81.

In addition, it will be noted that as best seen in FIG. 4 the piston 81 is provided with a suitable number of circumferentially spaced orifices 88 extending therethrough and establishing communication between the chamber 80 and the annular space 86 between skirt 84 and housing 61. Means are provided to enable filling of the chamber 80 and the annular space 86 as by the provision of a filler opening 89 provided with a closure plug 90 in the annular piston 76.

It will now be apparent that in order to actuate the holddown mechanism when the latter is attached to a packer of the type previously described, it will be necessary to rotate the holddown mandrel 1, and consequently the packer mandrel 3, until such time as the dog portion 44 of the packer control machanism is disposed in the clearance space or slot 50 through the wickers 41 on packer mandral 3, whereupon the mandrel 1 and consequently the mandrel 3 will be moved downwardly in the well relative to the drag block carrier housing 22 which will remain stationary in the casing C due to frictional engagement of the drag blocks 27 with the casing C. Such downward movement of the mandrel 1 will bring the flange 60 into engagement with the shoulder 87 as shown in FIG. 2a, so that such downward movement will be transmitted to the slip carrier ring 63 through the housing 61 of which the sleeve 82 is a part. Ordinarily the packer element 6 will resist axial compression to the extent that further downward movement of the mandrel 1 will wedge the slips 66 laterally of the assembly into engagement with the casing C.

Since the slips 66 are provided with upwardly facing wickers or teeth 66' which will not effectively bite into the casing C during downward movement of the slips, such movement will be transmitted from the mandrel 1 through the slips to the connector sub 69 which is now free for downward movement since the coupling 2 has been moving downwardly with the mandrel as shown in FIG. 2a. Such continued downward movement in a conventional manner will set the packer mechanism P by wedging the downwardly holding packer slips 12 into engagement with the casing C as shown in FIG. 2b, and will deform element 6 due to the axial loading thereof into sealing engagement with the casing C.

During initial downward movement of the mandrel 1, fluid in chamber 80 and annular space 86 will be transferred from the chamber 80 to a chamber 80a formed between the flange 60 on mandrel 1 and the flange 62 at the upper end of housing 61 as the mandrel moves downwardly relative to the housing. Preferably, the respective volumes of chambers 80 and 80a are equal, or the volume of chamber 80a may be slightly greater than the volume of chamber 80. In either case, as fluid is being transferred from chamber 80 to chamber 80a during downward movement of the mandrel 1, the sleeve 75 will be moved upwardly relative to the piston 81 carried by the housing 61, by reason of hydrostatic pressure in the casing acting upon the lower face of the annular piston 76 of sleeve 75. Ultimately, therefore, the skirt 77 on sleeve 75 will be spaced from the connector sub 69 as shown in FIG. 2a. Moreover, it should be noted that hydrostatic pressure in the casing C acting downward on the housing flange 62 will cause the housing to move downwardly along with the mandrel 1 until the slips 66 are moved into frictional engagement with the casing C, provided the orifices 88 extending through piston or barrier 81 offer no substantial restriction to the transfer of fluid from chamber 80 to chamber 80a. If the well should be a dry hole and therefore hydrostatic pressure be absent, the motion-reversing device operates by direct contact of the flange 60 with the shoulder 87, thereby forcing transfer of oil from chamber 80 into the partial vacuum developed in chamber 80a.

Ultimately the weight of the string of drill pipe or tubing on which the assembly is supported, rests upon the slip carrier ring 63 and consequently urges the slips 66 into engagement with the casing C. Under these circumstances, any tendency of the assembly to move upwardly in the casing C responsive to fluid pressure acting upwardly on the lower end of the tool will cause the cone section 68 of connector sub 69 to wedge the slips 66 into a firmer set against the casing to resist such upward movement.

When it is desired to release the tool, the drill pipe or tubing is elevated or raised, which results in the reverse action between the sleeve 75 and the housing 61, so that the slips 66 are pulled upwardly while the connector sub 69 is pushed downwardly thus to relieve the wedging effect of expander 68 of slips 66 and retract the slips from anchoring engagement with the casing.

Referring particularly to FIG. 2a in this connection, it will be noted that chamber 80a contains fluid which will be transferred through end ports 85 in sleeve 82 into annular space 86, through orifices 88 and into chamber 80 between pistons 76 and 81. Preferably the relative operating areas of pistons 76 and 81, and flange 60 which it will now be recognized also constitutes a power piston, are such that a substantial hydromechanical advantage is realized.

When the tool is being released, fluid in chamber 80a is acted upon by the relatively small annular area of the upper face 60a of mandrel flange or power piston 60. Hydraulic pressure acts upwardly upon the annular area represented by the inner face 62a of flange 62 on the housing 61 to provide a force tending to pull the slips 66 upwardly. The same pressure acts downwardly through annulus 86 upon the upwardly facing area 76a of piston 76; thus the reverse acting forces applied to the housing 61 and the connector sub 69 tending to release the slips 66 from engagement with the casing, will be proportional to the relationship that the working areas of flange 62 and piston 76 bear to the working area of power piston 60. It will therefore be readily appreciated that preferably there is a favorable ratio of effective operating areas on the piston 76 and the power piston 60, for example, of 2:1, as a result of which (since the effective areas of flange 62 and power piston 60 are equal) there will be a 3:1 hydromechanical advantage in releasing the anchor slips 66 from the casing C, i.e. a pull of 10,000 pounds on the mandrel 1 in an upward direction will impose a 10,000 pound force tending to move the housing 61 upwardly and a 20,000 pound force tending to move the connector sub 69 downwardly, or a net force of 30,000 pounds tending to release the slips.

From the foregoing it will be apparent that I have provided a holddown device which in its action while being set is extremely simple, and corresponds essentially to mechanical holddowns which have been used extensively in the past in non-retrievable packer holddowns, inasmuch as it has no significant effect on the setting of the holddown slips other than to transmit the set down load to the latter from the tubing string. However, due to the novel fluid operated reverse acting mechanism described above, the slips may be easily and effectively released from their anchoring engagement with the casing without requiring the exertion of an undesirably high tension strain on the running-in string of pipe. Consequently the risk of separation of the running-in string of pipe is effectively reduced. In addition the holddown tool effectively holds the packer against upward movement with requiring hydraulic actuation by fluid being pumped through the holddown, and the possibility of a stuck tool due to clogging is effectively avoided.

In the modification of FIGS. 6–10 there is shown a packer construction embodying the novel holddown mechanism described above, so that same reference numerals are equally applicable to the packer construction and for the most part the details require no further specific description.

The connector sub, however, which is identified at 69 in the previously described embodiment, is modified in the embodiment of FIGS. 6–10 so that when the packer is set in a well, release of the holddown mechanism is assured, notwithstanding the possibility that downward movement of the connector sub and consequent downward movement of the expander cone section 68 of the connector sub 69, may be precluded by virtue of high hydrostatic pressures having completely compressed the rubber packer element 6 to a maximum extent, or the possibility that sand may have filled the space beneath the packer element such that it cannot be forced downwardly. To this end, the connector sub in this modified construction is provided with means enabling it to be foreshortened under certain conditions so as to allow the expander cone section 168 thereof to move downwardly responsive to the application of hydraulic pressure to the actuator sleeve 75 when it is desired to release the tool through the reverse acting pressure responsive mechanism described above.

Referring to FIG. 6, the modified construction is shown in condition for being run into a well. The connector sub in this construction includes a longitudinally extended two-part housing composed of a pair of similar half sections 169, each having at its upper end a radially inwardly extended flange 170 disposed in a groove 171 in the upper expander cone section 168. Cap screws 172 are preferably employed to retain the housing sections 169 in place.

At its lower extremity, each housing section 169 is provided with a radially inwardly off-set section 173 which is slidable in a radial groove 174 formed in a collar 175 which is threaded into the gauge ring 7 and constitutes the lower extremity of the connector sub. A ring 176 extends about the collar 175 and is suitably secured in place so as to retain the off-set section 173 in the groove 174.

At its upper end the collar 175 is provided with or has connected thereto, a ring 177 from which project upwardly a plurality of longitudinally extended and circumferentially spaced spring fingers 178. The ring 177 is preferably connected to the collar 175 by means of a split sectional coupling ring 179 which is held in assembled relation to the collar 175 and ring 177 by the housing sections 169.

The housing sections 169 adjacent their upper ends are provided with a radially inwardly extended flange 180 and a flange 181 spaced slightly beneath the flange 180 and projecting inwardly to a lesser extent than the latter so as to form therebetween a groove 182 for the reception of an abutment ring 183 having an end surface 184 engageable by the upper extremities of spring fingers 178 as shown in FIG. 6.

On its inner periphery the abutment ring 183 is provided with an angular seat 185 in which is engageable an annular projection 186 formed at the lower end of a sleeve 187 which is slidably disposed between the cone section 168 of the connector sub and the holddown mandrel 1. The lower end of the sleeve 187 is slidably disposed upon the mandrel coupling 2, as well as on the mandrel 1, and adjacent its upper end the sleeve 187 is provided with a radially inwardly off-set section 189 engageable with a shoulder 190 formed in the cone section 168. The lower extremity of the sleeve 187 on the projection 186 is provided with an angular face 191 engageable with a complemental angularly disposed face at the upper extremities of the spring fingers 178.

Figure 10:
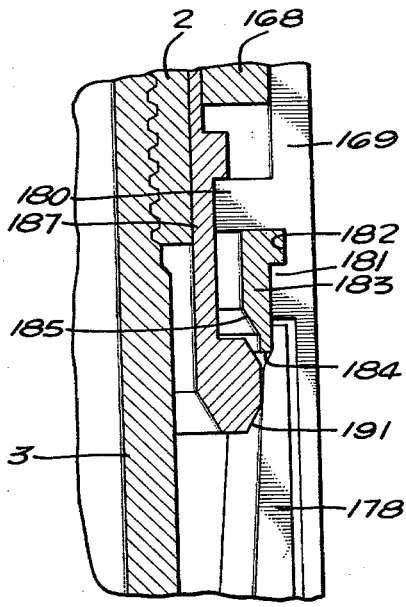
FIG. 10 is an enlarged fragmentary detail view of the section of the holddown mechanism of FIG. 8 embraced by the line 10.

The purpose of the projection 186 is to wedge or cam spring fingers 178 radially outwardly from the position shown in FIG. 6 to the position shown in FIGS. 8 and 10. When the spring fingers 178 are in the positions shown in FIGS. 8 and 10 it will be noted that the housing sections 169, and consequently the upper expander cone 168, are free to move downwardly relative to the gauge ring 7, a distance equal to the difference between the axial extent of groove 174 in collar 175 and the axial extent of radially inwardly off-set end 173 of housing sections 169.

Thus it is apparent that the connector sub in this modified construction, as distinguished from the same part in the construction first described, is susceptible of foreshortening in a manner which will permit the expander cone 168 to move downwardly from beneath the slips 66. Such foreshortening will be effected when, as a result of taking an upward pull on the mandrel 1 after the tool has been set in a well, fluid pressure transmitted to piston 76 of actuator sleeve 75 from chamber 80a to chamber 80 will shift the sleeve 75 downwardly as shown in FIG. 8, into abutting contact with the upper extremity of sleeve 187, thus urging annular projection 186 downwardly relative to spring fingers 178, so that the angularly disposed face 191 of projection 186 cams the fingers 178 outwardly to the positions shown in FIGS. 8 and 10. Otherwise the action of the holddown mechanism is the same as in the previously described embodiment so that further elucidation is not required in this connection.

When the modified construction of FIGS. 6 through 10 is being run into a well as shown in FIG. 6, it will be noted that mandrel coupling 2 engages the sleeve 187 at the radially inwardly extended section 189 thereof, but when the tool has been set in the well casing as shown in FIG. 7, the mandrel coupling 2 having moved down with the mandrel relative to the holddown assembly is spaced substantially downwardly from the radially inwardly extended section 189.

Foreshortening of the connector sub 69 occurs during the initial stages of upward movement of the mandrel 1 and consequently the mandrel coupling 2, as clearly illustrated in FIG. 8. Further upward movement of the mandrel 1 will bring the coupling 2 into engagement with the radially inwardly extended section 189 of sleeve 187, so as to move it back into engagement with shoulder 190 in expander cone section 168; and since the gauge ring 7 is limited in its upward movement by the split connector ring 70 as previously described, as the tool is stretched out fully with the mandrel piston 60 engaged with housing flange 62 as shown in FIG. 6, the annular projection 186 will be disposed in contact with the angularly disposed face 185 of stop ring 183, and the spring fingers 178 will again be free to assume the running-in position with their upper extremities engaged with the stop ring 183 as shown in FIG. 6.

In FIGS. 11 and 12 there is illustrated another construction in which the connector sub is modified so as to enable foreshortening thereof to assure release of the tool under adverse pressure or sand conditions as referred to above. In this construction the reverse acting slip releasing mechanism may be identical to that hereinabove described, or may be made in accordance with modifications thereof which will be hereinafter described, and the packer assembly P to which the holddown mechanism of FIGS. 11 and 12 is connected may be advantageously constructed as hereinabove described.

Referring to FIG. 11, the connector sub which is interposed between the slips 66 and the packer mechanism P is shown as including an upper expander cone section 268 slidably disposed upon the coupling 2 which is interposed between holddown mandrel 1 and the packer mandrel 3 as in the previously described embodiments.

Threadedly mounted upon the expander cone section 268 is an elongated sleeve 269 which is slidable at its lower extremity along the upper end of a lower connector sub section 269a. At its lower extremity the sleeve 269 has an inwardly extended shoulder or flange 270 engageable with a split stop ring 271 which is disposed in an annular groove 272 extending about the inner periphery of the lower connector sub section 269a. Thus, movement of the expander cone section 268 away from the lower connector sub section 269a is limited by engagement between flange 270 and stop ring 271 as shown in FIG. 11. When flange 270 and stop ring 271 are so coengaged there is provided therebetween an annular clearance space 273 in which is disposed resilient compressible or deformable means shown specifically by way of illustration in the form of a stack of coengaged Bellville washers 274 which, when in their relaxed conditions as shown in FIG. 11, resiliently hold the shoulder 270 against stop ring 271.

The Bellville washers 274 should be capable of withstanding compressive loading to the extent that downward motion will not be transmitted from the holddown slips 66 to the expander cone section 268 when the slips are being set in engagement with the casing. However, the Bellville washers should yield to enable downward movement of the expander cone section 268 relative to the lower connector sub section 269a when release of the holddown slips from engagement with the well casing C is desired.

As shown in FIG. 12, the Bellville washers are compressed so as to enable movement of expander cone section 268 downwardly to move flange 270 out of engagement with the stop ring 271 as indicated by the space designated 275. It will be apparent that such downward movement of the expander cone section 268 virtually foreshortens the axial dimension of the connector sub, so that wedging engagement of expander cone section 268 with the slips 66 is released so as to enable release of the slips from anchoring engagement with the casing C.

As in the construction previously described, downward movement of the expander cone section 268 is effected by engagement thereof by the lower extremity of the skirt 77 which forms a part of the actuator sleeve 75 as illustrated in the first described embodiment of the invention, while relative upward movement of the slips 66 is effected by the connection between the slips and the slip carrying section 63 which is supported on the housing 61 as in the first described embodiment.

Figure 13:
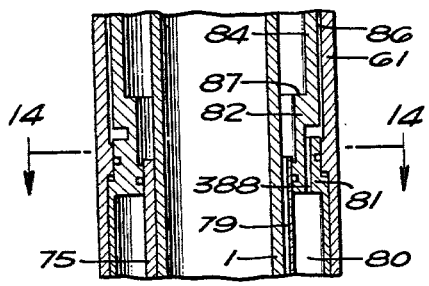
FIG. 13 is a fragmentary detail view in longitudinal section of still another modified form of holddown mechanism.
Figure 14:
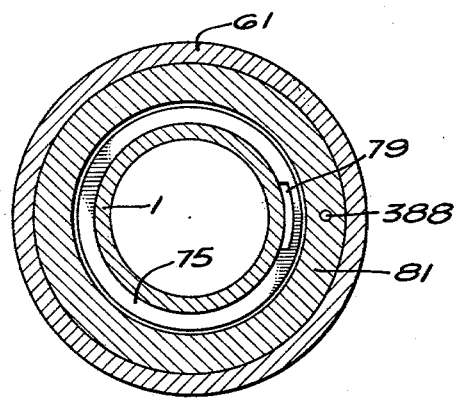
FIG. 14 is a view in transverse section on an enlarged scale as taken on the line 14—14 of FIG. 13.

Referring to FIG. 13, there is shown a fragmentary longitudinal section through a modification of the reverse acting hydraulic force transmitting device illustrated in the first described embodiment. In contrast with the construction of FIG. 1, wherein the annular piston 81 which is formed on or made a part of the housing 61 is provided with a series of circumferentially spaced ports 88 therethrough, in the modification of FIG. 13 there is but a single port 388 extending through the piston 81, so that there is a substantial restriction to the transfer of fluid through the orifice 388 from chamber 80 to chamber 80a, and vice versa.

As indicated in referring to the first described embodiment, the reverse acting hydraulic actuator mechanism of that embodiment had no effect on the setting of the holddown slips due to the absence of any substantial resistance or restriction to flow of fluid through the orifices 88. However, in the embodiment of FIG. 13, due to the presence of only a single small diameter orifice or due to the provision of an equivalent means to restrict the flow of fluid through the piston 81, a beneficial result occurs to the holddown mechanism during the slip setting operation. In this connection it will be noted that absent the restriction in the transfer of fluid between chambers 80 and 80a, the holddown mandrel 1 upon engagement of the piston or flange 60 thereof with the shoulder 87 of sleeve 82, causes downward movement of the sleeve 82 and housing 61 and resultant downward movement of the slip carrier ring 63 relative to the sleeve 75 and connector sub 69, thereby mechanically effecting initial expansion of the holddown slips 66 into sliding engagement with the casing C. This sliding engagement continues throughout the remaining downward movement of the connector sub 69 as the packing element 6 is expanded into engagement with the casing, possibly resulting in dulling of the slip teeth 66'.

However, in the case of the modified construction of FIG. 13, the rapid transfer of fluid from chamber 80 through annulus 86 and ports 85 into chamber 80a, is precluded, with the result that downward movement of the mandrel flange or piston 60 into engagement with shoulder 87, as shown in FIG. 2, will cause the transmission of a downward force to the sleeve 75 through the body of fluid retained in chamber 80 by reason of the restricted outlet 388. This downward force will in turn be transmitted to the connector sub 69 by the skirt 77 on sleeve 75 so as to prevent movement of expander cone section 68 and slip carrier ring towards one another as the downward force is transmitted to the rubber element 6 to effect expansion of the packer element. Following this, the slow bleeding of fluid from chamber 80 through restricted orifice 388 will allow the sleeve 75 to move upwardly into engagement with annular piston 81 so as to elevate the skirt 77 of the sleeve 75 out of engagement with the connector sub 69 as shown in FIG. 2a. Therefore, it is apparent that the modification of FIG. 13, by reason of the provision of the restriction to flow of fluid from chamber 80 into chamber 80a, has the advantage of holding the slips 66 against initial engagement with the casing until after the packer rubber 6 has been expanded into engagement with the casing. The efficiency of the slip teeth 66' is accordingly enhanced.

Figure 15:
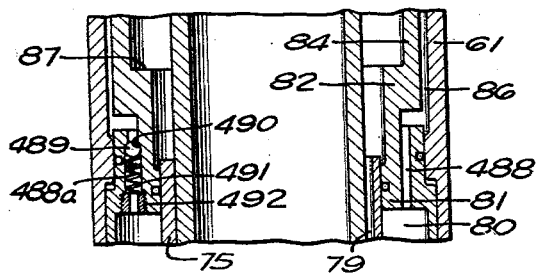
FIG. 15 is an enlarged fragmentary detail view in longitudinal section of still another modified form of holddown mechanism.

If desired, a further modification may be availed of as illustrated in FIG. 15, whereby the resistance to the transfer of fluid from chamber 80 into chamber 80a is present while the slips are being set, but is absent when the slips are being retrieved. In this way, release of the slips 66 is not deterred by the slow passage of fluid through piston 81. Referring to FIG. 15, the piston 81 is shown as being provided with a single relatively small orifice 488 therethrough, through which the fluid passes between chamber 80 and the annular space 86 between housing 61 and member 84, which annulus 86 communicates with chamber 80a as previously described. In angularly spaced relation to the restricted passage 488, a relatively large passage 488a is provided through the piston 81. In this passage 488a is a ball check valve 489 loaded into engagement with a seat 490 by a coiled compression spring 491, the ball and spring being retained in place by a ported plug 492. The ball check valve 489 will open to enable the rapid transfer of fluid from chamber 80a through annulus 86 into chamber 80 when the tool is being released, but the ball check valve will close so that the restricted orifice 488 becomes effective to resist the rapid transfer of fluid from chamber 80 into annulus 86 and thence into chamber 80a as the tool is being run into a well.

Thus it is apparent that the modification of FIG. 15 provides a structure having the advantage of holding the holddown slips 66 out of engagement with the casing during expansion of the packer element 6 into engagement with the casing as described in relation to FIG. 13. The resistance to flow of actuating fluid in the reverse acting hydraulic mechanism constructed in accordance with FIG. 15 need not be overcome in the slip releasing operation however, since the ball check valve 469 rapidly enables the transfer of fluid through piston 81.

Figure 16:
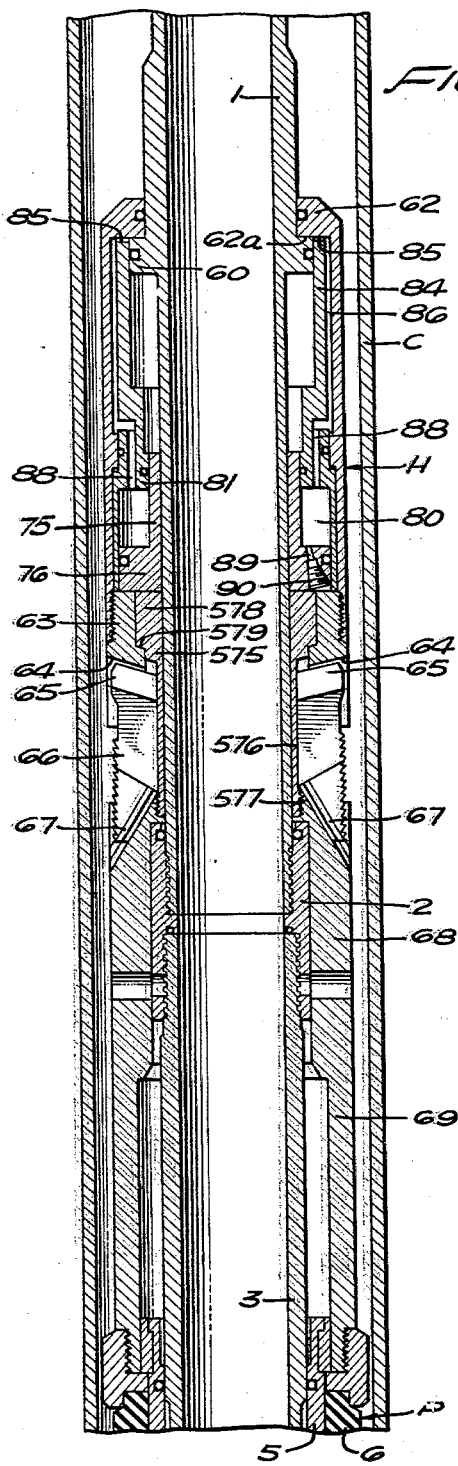
FIG. 16 is a fragmentary view in longitudinal section through still another modified form of holddown mechanism with the parts shown in condition for running into a well.
Figure 17:
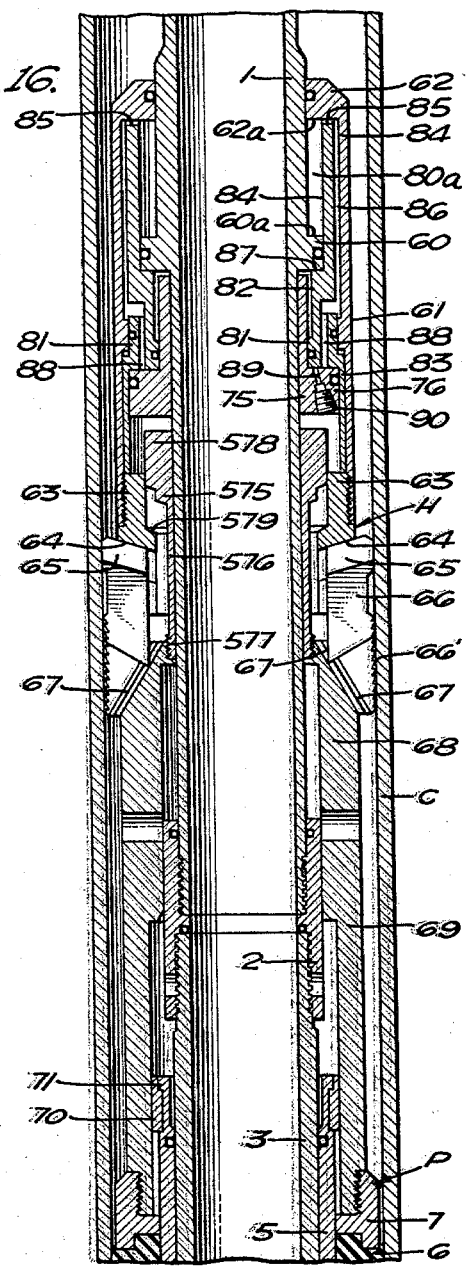
FIG. 17 is a view corresponding to FIG. 16, showing the holddown mechanism of FIG. 16 set in the well.

Referring now to FIGS. 16 and 17, there is shown a still further modified construction which in its essential aspects is similar to that initially described herein, with the exception that the actuator sleeve 75 terminates at its lower extremity in the piston 76; i.e. the integral skirt 77 on sleeve 75, as shown in the previous embodiments of the tool, is eliminated. Instead, in the modification of FIGS. 16 and 17, a second sleeve 575 is interposed between actuator sleeve 75 and expander cone section 68 of connector sub 69. The sleeve 575 includes an elongated section 576 slidably extending along the holddown mandrel 1 between the latter and the slips 66. The sleeve section 576 is threadedly connected at its lower extremity as 577 with the expander cone section 68. At its upper extremity the sleeve 575 is provided with an outstanding enlargement or flange 578 abuttable with the piston 76 of sleeve 75 at one end, and abuttable at the other end with a shoulder 579 formed on the slip carrier ring 63 of housing 61.

The slip carrier ring 63 it will be noted, is slidable longitudinally of the flange 578, so that as the holddown slips 66 are being set responsive to downward movement of housing 61, which will be effected as previously described, shoulder 579 of slip carrier ring 63 will move downwardly relative to the flange 578 of sleeve 575 to the relative position shown in FIG. 17 as the slips 66 are expanded into engagement with the casing C. In addition, it will be noted that sleeve 75, due to the effect of hydrostatic well pressure on piston 81 will effect the transfer of fluid from chamber 80, through annulus 86 and end ports 85, into chamber 80a as the sleeve 75 moves upwardly relative to housing 61.

Upon retrieval of the holddown device of FIGS. 16 and 17 and responsive to the reverse acting effect of the actuator mechanism as previously described, sleeve 75 will be effective to exert a downward force on sleeve 575 as housing 61 exerts an upward force on slip carrier ring 63 so as to retract the slips 66 from engagement with the well casing.

By reason of the interconnection of sleeve 575 with expander cone section 68 and the shouldering of sleeve flange 578 with shoulder 579 on slip carrier ring 63, the forces tending to separate slip carrier ring 63 and slip expander cone 68 are effectively precluded from being imposed upon the T-head and dove-tailed sliding connections of the slips 66 to these parts respectively when the slips 66 are retracted. Accordingly, the sliding slip connections cannot be damaged due to their being excessively strained during release of the tool from a well casing.

While the specific details of the several embodiments of the invention have been herein shown and described, changes and alterations may be resorted to without departing from the spirit of the invention as defined in the appended claims.

I claim:

1. A well tool comprising, a longitudinally extended body connectible to a string of pipe so as to be disposed in a well bore having casing therein, first casing engaging means carried by said body and expandible into engagement with said casing, second casing engaging means carried by said body including an expander and a plurality of slip elements wedgingly contacting said expander and actuator means for causing said slip elements to be wedged into engagement with said casing upon movement of said body in one direction relative to said expander, said actuator means including a first member interengageable with said slip elements and a second member interengaged with said expander, means for moving said first and second members oppositely upon movement of said body in the other direction relative to said expander for forcing said slip elements and said expander oppositely and out of wedging engagement with the casing.

2. A well tool comprising, a longitudinally extended body connectible to a string of pipe so as to be disposed in a well bore having casing therein, first casing engaging means carried by said body and expandible into engagement with said casing, second casing engaging means carried by said body including an expander and a plurality of slip elements wedgingly contacting said expander, and hydraulic actuator means for causing said slip elements to be wedged into engagement with said casing upon movement of said body in one direction relative to said expander, said actuator means including a first member interengageable with said slip elements and a second member interengaged with said expander, fluid pressure responsive means on the first and second members for moving the same oppositely upon movement of said body in the other direction relative to said expander for forcing said slip elements and said expander oppositely and out of wedging engagement with the casing.

3. In double holding well packer comprising, a longitudinally extended body connectible to a string of pipe so as to be disposed in a well bore having casing therein, said body having thereon in longitudinally spaced relation downwardly holding slip means expansible into engagement with said casing, resilient packer means expansible into engagement with said casing, upwardly holding slip means expansible into engagement with said casing, and actuator means interengaged with said body and said upwardly holding slip means for expanding the upward holding slip means into engagement with said casing upon movement of said body in one direction, said upwardly holding slip means including an expander shiftably disposed on said body and a plurality of slips engageable by said expander and connected to said actuator means, and said actuator means including a first member interengageable with said expander and a second member interengaged with said slips, means for moving said first and second members oppositely for forcing said slips and said expander in opposite axial directions upon movement of said body in the other direction to release said upwardly holding slips from said casing.

4. A well packer as defined in claim 3, wherein the means for forcing said slips and said expander in opposite directions includes means for exerting a greater force on said slips and said expander than the force exerted upon said body to move the body in said other direction.

5. A well packer as defined in claim 3, wherein said actuator means includes a housing slidably disposed about said body and sealingly engaged with the body at one end of the housing, the other end of the housing being connected to said slips, said housing having an annular barrier between its ends projecting towards said body, an actuator sleeve slidably disposed on said body in said housing and having an annular piston slidably sealed in the housing between said barrier and said slips, said actuator sleeve having a portion engageable with said expander, said body having an actuator piston slidably sealed in the housing between the first mentioned end of the housing and said barrier, said barrier having a fluid passage therethrough communicating to opposite sides thereof, and said housing containing fluid displaceable through said passageway to opposite sides of said barrier upon movement of said body in opposite directions relative to said barrier.

6. A well packer as defined in claim 5, wherein the fluid passage through said barrier is of such size as to cause a substantial restriction to flow of fluid from one side of said barrier to the other side thereof.

7. A well packer as defined in claim 5, wherein the fluid passage through said barrier is of such size as to cause a substantial restriction to flow of fluid from one side of said barrier to the other side thereof, said barrier also having an enlarged passageway therethrough and a check valve in said enlarged passageway to eliminate any substantial restriction to the flow of fluid in one direction through said barrier.

8. A well packer as defined in claim 5, including a connector member interconnected with said expander and extending towards said actuator means, said connector member being slidably interengaged with said housing and having means for limiting relative separation of said expander and said housing, said connector member being disposed in the path of said actuator sleeve.

9. A well packer as defined in claim 3, including a member on said body shiftable relative to said downwardly holding slip means for expanding said resilient packer means into engagement with said casing, and a connector means between said member and said expander, said connector means including yieldable means normally preventing movement of said expander towards said member and deformable to permit such movement upon operation of said actuator means to release said upwardly holding slip means from said casing.

10. A well packer as defined in claim 3, including a member on said body shiftable relative to said downwardly holding slip means for expanding said resilient packer means into engagement with said casing and a connector means between said member and said expander, said connector means including a plurality of circumferentially spaced laterally deflectable spring fingers and a part engageable by said fingers, said fingers and said part being respectively connected to said last-mentioned member and said expander, and means operable by said actuator means for deflecting said fingers laterally from engagement with said part.

11. A well packer as defined in claim 3, including a member on said body shiftable relative to said downwardly holding slip means for expanding said resilient packer means into engagement with said casing and a connector means spacing said member from said expander, said connector means including a pair of telescopically inter-engaged parts having opposed faces longitudinally spanning the space between said member and said expander thereby defining a cylindrical space, one of said parts being connected to said expander and the other of said parts being connected to said last-mentioned member, and resilient deformable means disposed in said cylindrical space between said faces.

12. In a well packer comprising, a longitudinally extending body connectible to a string of pipe so as to be disposed in a well bore having casing therein, a resilient packer element disposed about said body and deformable into sealing engagement with said well casing, slip means including an expander and a plurality of laterally movable slips engageable with said expander and movable into engagement with the well casing, and actuator means on the body for moving the slips relative to the expander to and from engagement with said well casing, a member connected to said packer element, connector means extending between said expander and said member, said connector means including a first part connected to said expander and a second part connected to said member, and yieldable means between said parts normally preventing relative movement of said expander towards said member, and means connected to said actuator and engageable with said yieldable means for overcoming said yieldable means to allow movement of said member and expander relatively toward one another and for retracting said slips from said well casing.

13. A well packer as defined in claim 12, wherein said yieldable means includes a plurality of circumferentially spaced laterally deflectable spring fingers on one of said parts and an element on the other part engageable by said fingers, and by said means connected to said actuator means for deflecting said fingers laterally from engagement with said part.

14. A well packer as defined in claim 12, wherein said connector means includes a pair of telescopically inter-engaged parts having opposed faces longitudinally spanning the space between said member and said expander thereby defining a cylindrical space, one of said parts being connected to said expander and the other of said parts being connected to said member, and said yieldable means incluuding resilient deformable means disposed in said cylindrical space.

15. A well packer comprising, a longitudinally extended body connectible to a string of pipe so as to be disposed in a well bore having casing therein, said body having thereon in longitudinally spaced relation slip means expansible into engagement with said casing, resilient packer means carried by said body and also expansible into engagement with said casing, and actuator means interengaged with said body and said slip means for expanding said slip means into engagement with said casing and for expanding said packer means upon movement of said body relative to the packer means in one direction, said actuator means including oppositely movable parts, said slip means including an expander element shiftably disposed on said body and a plurality of slips engageable by said expander element, a slip supporting element, one of said elements being connected to one of said actuator parts, said other part engaging the other element, and said actuator means including means for forcing said parts oppositely to force said slips and said expander element oppositely upon movement of said body in the other direction to release said slips from said casing.

16. A well packer as defined in claim 15, wherein said actuator means includes means for exerting a greater force on said slips and said expander element than the force exerted upon said body to move the body in said other direction.

17. A well tool of the class described comprising, a longitudinally extended body, an expander disposed about said body, means shiftably supported on said body and engageable with the wall of a well bore for preventing movement in one direction of said expander upon movement of said body in the other direction, a plurality of slip elements disposed about said body and engaged with said expander, and actuator means carried by said body and including a member interengageable with said expander and a member interengaged with said slip elements, means for moving said member connected to said slips towards said expander to force said slips into engagement with the well bore upon movement of the body in said one direction and for moving said members oppositely for exerting forces to separate said expander and said slips upon movement of said body in the other direction.

18. A well tool as defined in claim 17, wherein said actuator means includes a housing slidably disposed about said body and sealingly engaged with the body at one end of the housing, the other end of the housing being connected to said slips, said housing having an annular barrier between its ends projecting towards said body, an actuator sleeve slidably disposed on said body in said housing and having an annular piston slidably sealed in the housing between said barrier and said slips, said actuator sleeve having a portion engageable with said expander, said body having an actuator piston slidably sealed in the housing between the first mentioned end of the housing and said barrier, said barrier having a fluid passage therethrough communicating to opposite sides thereof, and said housing containing fluid displaceable through said passageway to opposite sides of said barrier upon movement of said body in opposite directions relative to said barrier.

19. A well tool as defined in claim 18, wherein the fluid passage through said barrier is of such size as to cause a substantial restriction to flow of fluid from one side of said barrier to the other side thereof.

20. A well tool as defined in claim 18, wherein the fluid passage through said barrier is of such size as to cause a substantial restriction of flow of fluid from one side of said barrier to the other side thereof, said barrier also having an enlarged passageway therethrough and a check valve in said enlarged passageway to eliminate any substantial restriction to the flow of fluid in one direction through said barrier.

21. A well tool as defined in claim 18, including a connector member interconnected with said expander and extending towards said actuator means, said connector member being slidably inter-engaged with said housing and having means for limiting relative separation of said expander and said housing, said connector being disposed in the path of said actuator sleeve.

22. A reverse acting hydraulic actuator mechanism for well tools comprising, a longitudinally extended body having an annular actuator piston thereon, a housing slidably disposed about said annular piston and sealingly engaged with said body at one side of said piston so as to define a first chamber therebetween, an actuator sleeve slidable on said body and sealingly engaged within said housing, a barrier in said housing sealingly engaged with said actuator sleeve so as to define between said housing and said actuator sleeve a second chamber, said barrier having a fluid passage leading therethrough between said first and second chambers and a liquid filling said housing.

23. An actuator device as defined in claim 22, wherein said fluid passage is of such size as to create a substantial resistance to the transfer of liquid between said chambers.

24. An actuator device as defined in claim 23, wherein said housing is provided with a large fluid passageway leading between said chambers and having a check valve therein for relieving the restriction to transfer of fluid between said chambers in one direction.

25. An actuator device as defined in claim 22, wherein said actuator sleeve is provided with an annular piston slidably and sealingly engaged with said housing, said annular piston on said actuator sleeve and said annular piston on said body having effective areas exposed to liquid in the ratio of 2:1.

26. A well tool adapted to be run into a well bore on a running-in string of pipe, including: an elongated body, a plurality of slips supported about said body, an expander also disposed about said body and movable thereon relative to said slips, actuator means including a pair of oppositely movable members, the members of said pair being respectively operatively engageable with said slips and with said expander to move the latter towards one another to effect outward movement of said slips into engagement with a casing disposed in said well bore and to retract said slips upon movement of said body in opposite directions longitudinally of said well bore, said actuator means having means for moving said member engageable with said expander relative to said member engageable with said slips for shifting said expander relatively away from slips and relieving the wedging action of said expander on said slips upon longitudinal movement of said body in one of said directions.

27. A well tool comprising in combination: a longitudinal tubular mandrel connectible to a pipe string so as to be disposed in a well, said mandrel having an outer surface and an annular piston at the lower end of said surface, a housing encircling a portion of said mandrel and having a bore slidably receiving said annular piston, the housing having an end flange slidably receiving said outer surface, said piston and said end flange defining a first chamber between said mandrel and said housing, a sleeve mounted for longitudinal movement within the housing and encircling a portion of the mandrel and having an annular piston and a cylindrical surface, the housing having an inwardly directed annular piston thereon slidably engaging said cylindrical surface and a coaxial bore slidably engaged by said piston on said sleeve, the latter of said pistons defining a second chamber between the housing and said sleeve, and a passageway connecting said chambers.

28. A well tool comprising in combination: a longitudinal tubular mandrel connectible to a pipe string so as to be disposed in a well within a casing, said mandrel having an outer surface and an annular piston at the lower end of said surface, a housing encircling a portion of said mandrel and having a bore slidably receiving said annular piston, the housing having an end flange slidably receiving said outer surface, said piston and said end flange defining a first oil chamber between said mandrel and said housing, a sleeve within the housing and encircling a portion of the mandrel and having an annular piston and a cylindrical surface, the sleeve being longitudinally movable with respect to both the housing and the mandrel, the housing also having an inwardly directed annular piston thereon slidably engaging said cylindrical surface and a coaxial bore slidably engaged by said piston on said sleeve, the latter said pistons defining a second oil chamber between the housing and said sleeve forming a passageway connecting said oil chambers, and a part movably mounted on the mandrel connected for actuation by said sleeve.

29. A well tool comprising in combination: a longitudinal tubular mandrel connectible to a pipe string so as to be disposed in a well below the liquid level therein, said mandrel having an outer surface and an annular piston at the lower end of said surface, a housing encircling a portion of said mandrel and having a bore slidably receiving said annular piston, the housing having an end flange slidably receiving said outer surface, said piston and said end flange defining a first chamber between said mandrel and said housing, a sleeve within the housing and encircling a portion of the mandrel and having an annular piston and a cylindrical surface, the sleeve being longitudinally movable with respect to both the housing and the mandrel, the housing also having an inwardly directed annular piston thereon slidably engaging said cylindrical surface and a coaxial bore slidably engaged by said piston on said sleeve, the latter said pistons defining a second chamber between the housing and said sleeve, said end flange on the housing and the piston on said sleeve each having a portion exposed to liquid in the well, and a passageway connecting said chambers.

30. A well tool comprising in combination: a longitudinal tubular mandrel connectible to a pipe string so as to be disposed in a well casing below the liquid level therein, said mandrel having an outer surface and an annular piston at the lower end of said surface, a housing encircling a portion of said mandrel and having a bore slidably receiving said annular piston, the housing having an end flange slidably receiving said outer surface, said piston and said end flange defining a first chamber said between said mandrel and said housing, a sleeve within the housing and encircling a portion of the mandrel and having an annular piston and a cylindrical surface, the sleeve being longitudinally movable with respect to both the housing and the mandrel, the housing also having an inwardly directed annular piston thereon slidably engaging said cylindrical surface and a coaxial bore slidably engaged by said piston on said sleeve, the latter said pistons defining a second chamber between the housing and said sleeve, said end flange on the housing and the piston on said sleeve each having a portion exposed to liquid in the well, a passageway connecting said chambers, and a part movably mounted on the mandrel connected for actuation by said sleeve.

31. A well tool comprising in combination: a longitudinal tubular mandrel connectible to a pipe string so as to be disposed in a well casing, said mandrel having an outer surface provided with an annular piston thereon, a housing encircling a portion of said mandrel and having a bore slidably receiving said annular piston, a member projecting radially inwardly from said housing and slidably receiving said outer surface of said mandrel, said piston and said member defining an annular axially extending closed space between said mandrel and said housing, a barrier member in said space dividing the latter into first and second fluid chambers, a body of fluid confined within said space and filling said chambers, first and second laterally expansible casing engaging means operable upon relative longitudinal movement between said housing and said mandrel in one direction, and said barrier member having a restricted passage therethrough to retard the flow of fluid from one of said chambers into the other of said chambers upon such relative longitudinal movement of said housing and said mandrel whereby said first laterally expansible casing means will be actuated into engagement with said casing in advance of said second casing engaging means.

32. A well tool as defined in claim 31 wherein said barrier member comprises means for allowing the free passage of said fluid from said second chamber into said first chamber upon relative longitudinal movement of said housing and said mandrel in the other direction.

33. A well tool as defined in claim 31 wherein said first laterally expansible casing engaging means comprises slip elements, means supporting said slip elements for lateral movement relative to said mandrel, an expander cone engaged with said slip elements and resilient packer means engaged with said expander cone and axially deformable for effective lateral expansion into sealing contact with said casing following the engagement of said slip elements with said casing.

34. A well tool as defined in claim 33 wherein the said second laterally expansible casing engaging means comprises anchor elements having means for forcing the same laterally following the transfer of fluid through said barrier member from said one of said chambers into said other of said chambers.

35. A hydraulically operated packer hold-down device comprising a pair of relatively axially movable tubular members, means for connecting said members to a run-in string of pipes and to a packer mechanism, means on each of said members sealingly engaged with the other of said members and defining an annular axially extended closed space therebetween, said space containing hydraulic pressure fluid, a barrier member dividing said space into first and second chambers and providing a restricted opening for retarding the flow of fluid from one of said chambers into the other of said chambers upon relative telescopic movement in one direction, one of said members having an annular piston slidable within the other of said members for forcing said fluid through said restricted passage upon such relative telescopic movement of said members, laterally expansible casing engaging anchor elements carried by one of said members for lateral movement, and means for forcing said casing engaging elements laterally outward upon the transfer of said fluid from said first chamber into said second chamber.

36. A hydraulically operated packer hold-down device as defined in claim 35 wherein said barrier member includes means for allowing the free flow of said fluid from said other of said chambers into said one of said chambers upon telescopic movement of said members in the other direction.

References Cited by the Examiner

UNITED STATES PATENTS

| 2,122,742 | 7/38 | Haus | 166—134 |
| 2,681,113 | 6/54 | Baker et al. | 166—134 X |
| 2,765,853 | 10/56 | Brown | 166—134 |
| 2,815,080 | 12/57 | Long | 166—134 |

BENJAMIN HERSH, *Primary Examiner.*